United States Patent
Jotanovic

(10) Patent No.: US 8,560,013 B2
(45) Date of Patent: Oct. 15, 2013

(54) AUTOMATIC STATUS UPDATE FOR SOCIAL NETWORKING

(75) Inventor: Mark Aleksandar Jotanovic, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 284 days.

(21) Appl. No.: 12/967,138

(22) Filed: Dec. 14, 2010

(65) Prior Publication Data

US 2012/0149345 A1 Jun. 14, 2012

(51) Int. Cl.
*H04W 88/02* (2009.01)

(52) U.S. Cl.
USPC ............. 455/557; 455/569.2; 455/414.2; 455/517

(58) Field of Classification Search
USPC .......... 455/517, 519, 509, 542.1, 569.2, 557, 455/414.1, 520, 550.1, 41.1, 464, 515, 419, 455/41.2, 420, 414.2; 709/219; 701/31.5, 701/29.1, 118; 705/14.53, 14.54
See application file for complete search history.

(56) References Cited

U.S. PATENT DOCUMENTS

2002/0090954 A1* 7/2002 Tanaka et al. ................. 455/456
2007/0255807 A1* 11/2007 Hayashi et al. ............... 709/219
2008/0155080 A1 6/2008 Marlow et al.
2009/0067449 A1* 3/2009 Tian ............................ 370/467
2012/0259728 A1* 10/2012 Inghelbrecht et al. ....... 705/26.5

FOREIGN PATENT DOCUMENTS

| WO | WO-2007127643 A2 | 11/2007 |
| WO | WO-2008105766 A1 | 9/2008 |
| WO | WO-2009023701 A2 | 2/2009 |
| WO | WO-2009043020 A2 | 4/2009 |

* cited by examiner

*Primary Examiner* — John J Lee
(74) *Attorney, Agent, or Firm* — Gifford, Krass, Sprinkle, Anderson & Citkowski, P.C.

(57) ABSTRACT

The present invention is a computer based method for updating a user's social networking status based on the user's activities within a vehicle. A vehicle multimedia system having a navigation or GPS system, music playing capability, or hands-free cell phone connectivity capability connects to a user's mobile device or cell phone. The mobile device being capable of accessing the user's social networking website via a mobile wireless network. The multimedia system is housed within the vehicle and is in communication with the mobile device. The vehicle multimedia system communicating information from the multimedia system regarding the multimedia system to and from the mobile device. Information generated on the vehicle multimedia system such as what music is being played, where the user is going, who the user is talking to, . . . etc. is communicated to the mobile device. Said information is updated to a social networking website to update the user's status to indicate activities presently occurring within the vehicle.

20 Claims, 3 Drawing Sheets

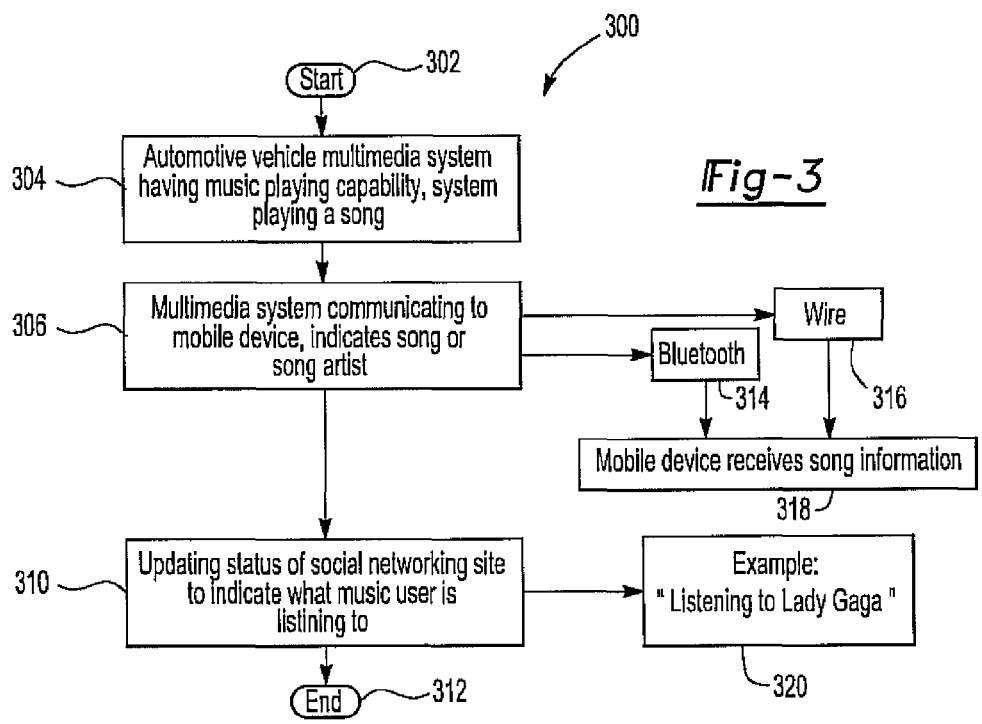
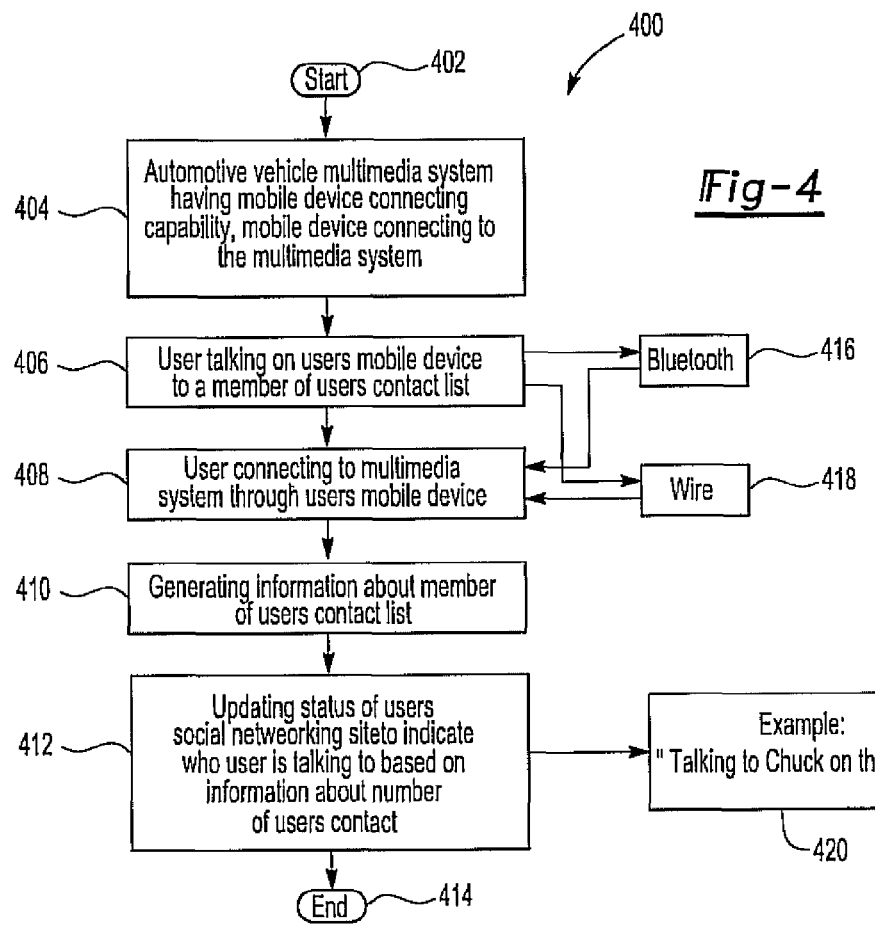

AUTOMATIC STATUS UPDATE FOR SOCIAL NETWORKING

FIELD OF THE INVENTION

The present invention relates generally to a vehicle multimedia system. In particular, the present invention relates to a vehicle multimedia system linked to a mobile device operable to automatically update a social networking website status.

BACKGROUND OF THE INVENTION

It is known in the art for a vehicle multimedia system to connect to a user's mobile device, such as a cell phone, so that the user may control various aspects of the mobile device. Sophisticated vehicle multimedia systems allow a user to connect to a mobile device to make hands-free calls through the vehicle multimedia system so that a user is not distracted by the mobile device. Furthermore, it is common for a vehicle multimedia system to incorporate the mobile device's contact list so that a user of the vehicle multimedia system and the mobile device may easily locate a person who they want to call. Vehicle multimedia systems also employ navigation or GPS systems to locate and direct a user to a desired location. Music information is frequently incorporated within the vehicle multimedia system. Such music information is inputted from various sources such as CDs, Mp3 players, mobile devices . . . etc. Having easy access to the music information allows a user to easily indicate to the vehicle multimedia system what music they want to listen to.

Social networking websites have become an everyday part of people's lives. Said social networking websites include an option for a user to update a status based on what the user is doing. It is commonly known that navigating a mobile device while driving is a highly dangerous activity. Accordingly, ways of updating a social networking website status without having to navigate a mobile device while driving is highly desirable.

SUMMARY OF THE INVENTION

The present invention is a computer based method for updating a user's social networking status based on the user's activities within a vehicle. A vehicle multimedia system having a navigation or GPS system, music playing capability, or hands-free cell phone connectivity capability connects to a user's mobile device or cell phone. The mobile device being capable of accessing the user's social networking website via a mobile wireless network. The multimedia system is housed within the vehicle and is in communication with the mobile device. The vehicle multimedia system communicates information from the multimedia system regarding the multimedia system to and from the mobile device. Information generated on the vehicle multimedia system such as what music is being played, where the user is going, who the user is talking to, . . . etc. is communicated to the mobile device. Said information is updated to a social networking website to update the user's status to indicate activities presently occurring within the vehicle.

BRIEF DESCRIPTION OF THE DRAWINGS

FIG. 3 is a flow diagram illustrating the process to update a user's status based on what music the user is listening to;

FIG. 4 is a flow diagram illustrating the method taken by the system to update who the user is talking to;

DETAILED DESCRIPTION OF THE INVENTION

Figure 1:
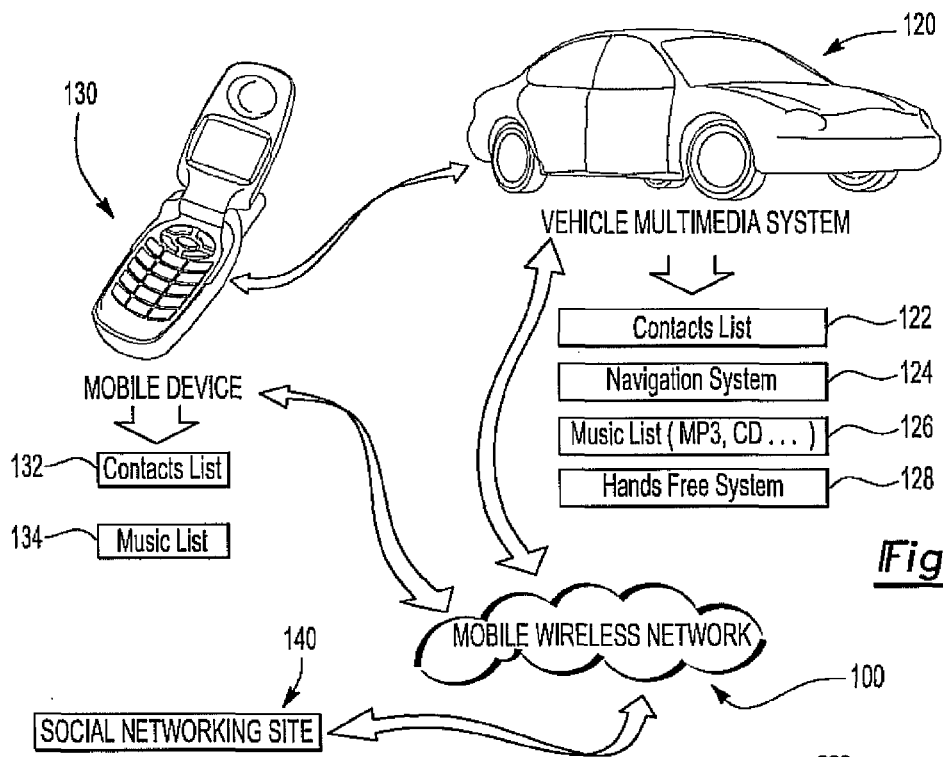
FIG. 1 is a system diagram of one embodiment of the present invention having a mobile wireless network.

The present invention relates to a method and system of updating a user's social networking website status based on activities presently happening within the vehicle. Information regarding where the user is going, who the user is talking to, or what music the user is listening to is automatically updated to the user's social networking website status.

A vehicle multimedia system 120 is disclosed having, but not limited to, a contact list 122, a navigation or GPS system 124, a music list 126, and a hands-free phone system 128. The vehicle multimedia system 120 may be hands-free to allow a user to operate the vehicle multimedia system 120 without having to press buttons and control the vehicle multimedia system 120 only by voice. The user may make calls to persons on the contact list 122 through the vehicle multimedia system 120 in a hands-free manner. Furthermore, the vehicle multimedia system 120 allows for navigation to a desired route by the vehicle navigation system 124. The music list 126 allows a user to play desired music in the vehicle multimedia system 120. The music list may be inputted via an external music playing device or by CD. The music list 126 may be a part of a greater music system connected to the vehicle multimedia system 120. The music system contained within the vehicle multimedia system 120 is also able to play satellite or regular wave radio.

The vehicle multimedia system 120 is in constant or irregular communication with the mobile device 130. The mobile device 130 may be a cell phone or personal electronic device, including, but not limited to a PDA, Mp3 player, tablet, laptop computer . . . etc. The mobile device 130 contains a contact list 132 and a music list 134. The mobile device 130 may operate as an MP3 player therefore having a music list 134. The mobile device 130 is also operable to connect to a mobile wireless network 100. The mobile wireless network 100 allows for a user to make phone calls over the mobile wireless network 100 using the mobile device 130. A user may also use the mobile device 130 to access the Internet over the mobile wireless network 100.

The mobile wireless network 100 is strong enough to allow for a user to access the Internet. More particularly, the mobile wireless network 100 allows a user to access their social networking website 140. The social networking website 140 is well known to allow a user to update their status. Various social networking websites 140 having social networking website status update capability allowing a user to manually update their status. The present invention allows for an automatic status update to the social networking website 140.

The mobile device 130 is operable to connect to the vehicle multimedia system 120 and the mobile wireless network 100. In an alternative embodiment, the vehicle multimedia system 120 connects directly to the mobile wireless network 100. The vehicle multimedia system 120 connects to the mobile device 130. Information is shared between the vehicle multimedia system 120 and the mobile device 130. Information regarding who the user is talking to from the user's contact list 120 is transferred to and from the mobile device 130 and the vehicle multimedia system 120. Information regarding where the user is traveling to or where the user is based on the navigation system 124 of the vehicle multimedia system is communicated to and from the mobile device 130 and the vehicle multimedia system 120. Information regarding where the user is heading based on their final destination on the navigation system 124 of the vehicle multimedia system is communicated to and from the mobile device 130 and the vehicle multimedia system 120. Information regarding what music a user is listening to from the music list 126 is communicated to and from the mobile device 130 and the vehicle multimedia system 120. Information from the vehicle multimedia system 120 is communicated to the mobile device 130. The mobile device 130 communicates the information to the mobile wireless network 100. The information communicated to the mobile device 130 is automatically updated to the social networking website 140. The information communicated to the social networking website 140 is updated to a user's status. A user may also elect to restrict and prohibit said automatic status updates.

Figure 2:
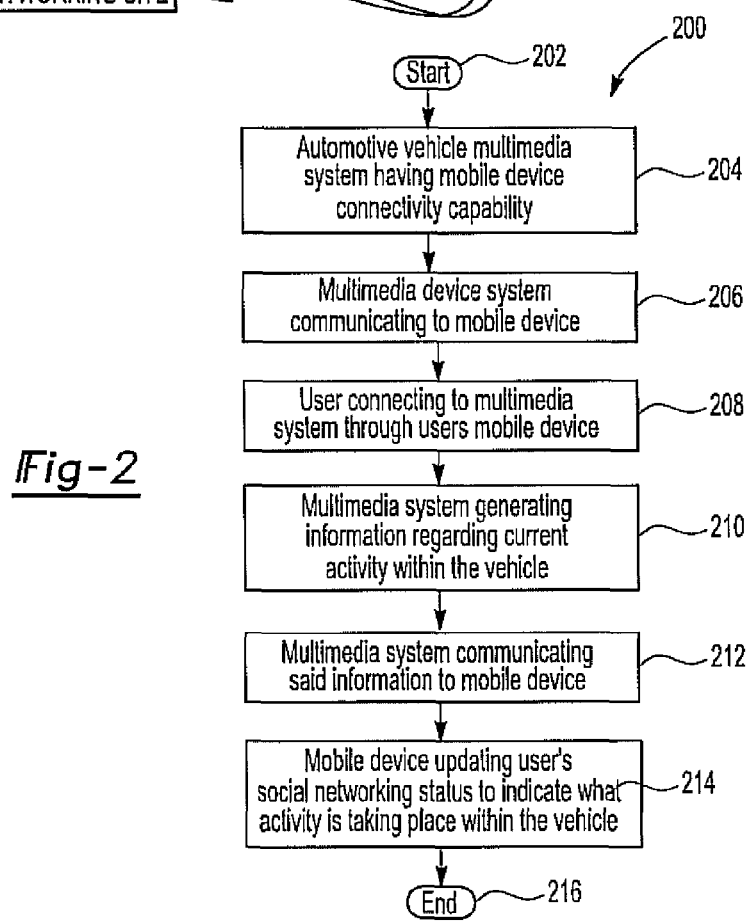
FIG. 2 shows a logical flow diagram of one embodiment of the present invention.

FIG. 2 shows a logic flow diagram 200 illustrating communication of information to and from the mobile device 130 in the vehicle multimedia system 120. A start 202 provides for an automotive vehicle multimedia system 204 having mobile device connectivity capability. The multimedia system then communicates 206 to the mobile device 130. A user then connects 208 to the multimedia system 120 through the user's mobile device 130. The multimedia system then generates information 210 regarding the current activity within the vehicle. The multimedia system then communicates 212 the information to the mobile device 130. The mobile device 130 then updates the user's social networking status 214 to indicate what activity is taking place within the vehicle. The system then ends the process 216.

FIG. 3 illustrates the logic flow diagram 300 illustrating automatic update of a user's social networking website status to indicate type of music being listed to. The start 302 moves to the automotive vehicle multimedia system 120 having music playing capability, the system 120 playing a song 304. The multimedia system 120 communicating 306 to the mobile device 130 indicating the song or song artist. The status of the social networking site is updated 310 to indicate what music the user is listening to. The process then ends 312. For example, the multimedia system 120 communicates to the mobile device 130 which is in connection to the mobile wireless network 120 to update a user's social networking website 140 status to say "Listening to Lady Gaga" or "Listening to Poker Face" or "Listening to Lady Gaga—Poker Face in my car."

FIG. 4 shows a logic flow diagram 400 at a start 402. The automotive vehicle multimedia system 120 having mobile device 130 connectivity capability, wherein the mobile device 130 connects 404 to the multimedia system 120. A user of the vehicle multimedia system 120 talks 406 on the user's mobile device 130 to a member of the user's contact list 122. The user connects 408 to the vehicle multimedia system 120 through the user's mobile device 130. The vehicle multimedia system generates information 410 about a member of the user's contact list 122. The status of a user's social networking site is updated 412 to indicate who the user is talking to based on information of the user's contact list 122. The process then ends 414. The vehicle multimedia system 120 connects to the mobile device 130 via Bluetooth 416 or a physical wire 418. An example indicated in FIG. 4 of an update to a social networking website status when a user is talking to a particular individual reads "Talking to Tom on the phone."

Figure 5:
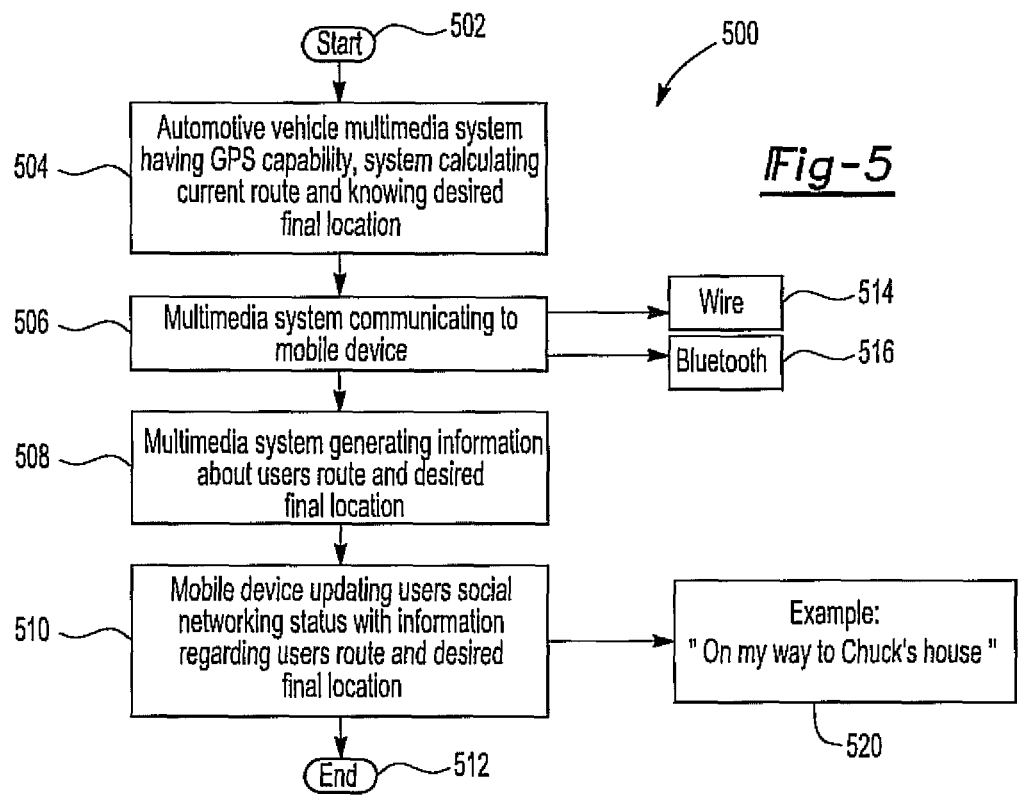
FIG. 5 is a flow diagram illustrating the process and method taken to illustrate where the user is going.

FIG. 5 illustrates the logic flow diagram 500 wherein a user's social networking website status is updated to indicate where the user is traveling to based on GPS activity. The start 502 moves to an automotive vehicle multimedia system 120 having a navigation system 124 or GPS capability. The vehicle multimedia system 120 calculating 504 the current route and knowing the desired final location. The vehicle multimedia system 120 communicating 506 to the mobile device. The vehicle multimedia system 120 communicates 506 to the mobile device 130 by means of a physical wire 514 or Bluetooth 516. The vehicle multimedia system 120 then generates information 508 about the user's route and final location. The mobile device 130 then updates a user's social networking website status through the mobile wireless network 100 regarding a user's route and desired final location 510. The process then ends 512. An example 520 of an updated user's status reads "On my way to Mark's house."

Figure 6:
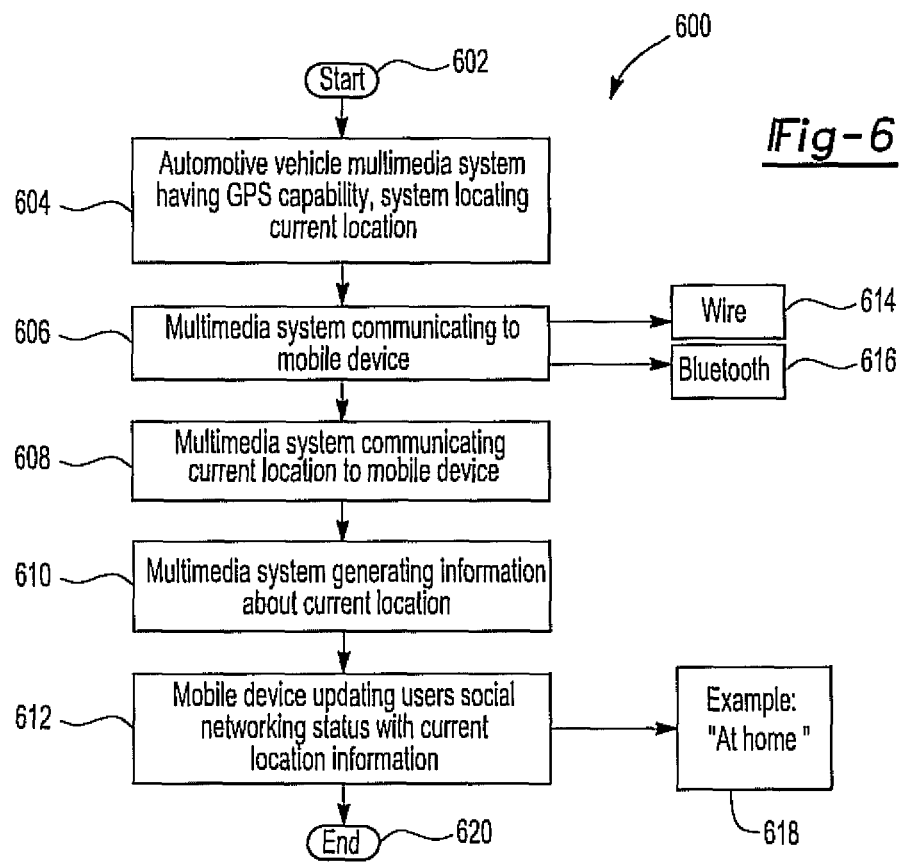
FIG. 6 is a flow diagram illustrating how a user status is updated to indicate where the user is presently located.

FIG. 6 illustrates the logic flow diagram 600 wherein a user's social networking website status is automatically updated through a user's mobile device 130 and a vehicle multimedia system 120 to indicate where the user is presently located. The start 602 moves to an automotive vehicle multimedia system having a navigation system 124 or GPS capability. The system 120 locating 604 the user's current location. The multimedia system 120 then communicates 606 to the mobile device 130. The mobile device 130 and the vehicle multimedia system 120 communicate via a physical wire 614 or Bluetooth 616. The vehicle multimedia system 120 then communicates current location 608 to the mobile device 130. The vehicle multimedia system 120 then generates information 610 about the current location of a user. The mobile device 130 then updates a user's social networking status 612 with the current information provided. The system then ends the process 620. An example 618 of an updated user's status reads "At Home."

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A computer based method for sharing a user's activities within a vehicle with a social networking website, the method comprising:

accessing a personal electronic device capable of accessing a user's social networking website;

communicating to a vehicle multimedia system housed in the vehicle, the vehicle multimedia system in communication with the personal electronic device, the vehicle multimedia system having a computer processing unit;

communicating information from the vehicle multimedia system regarding current activity occurring one of: a GPS, an audio player or a mobile phone occurring within the vehicle to and from the personal electronic device; and uploading information regarding current activity within the vehicle from the personal electronic device to post the information to the user's social networking website on a mobile wireless network.

2. The method of claim 1, wherein the method further includes the step of storing the information in the multimedia system.

3. The method of claim 1, wherein the method further includes the step of storing the information in the personal electronic device, including audio information such as a song name, artist name or album name.

4. The method of claim 1, wherein the multimedia system is capable of playing audio.

5. The method of claim 1, wherein the personal electronic device and the multimedia system communicate via Bluetooth.

6. The method of claim 1, wherein the personal electronic device and the multimedia system communicate over a satellite based network.

7. The method of claim 1, wherein the personal electronic device is a mobile phone.

8. The method of claim 7, wherein the mobile phone includes a contact list.

9. The method of claim 8, wherein the multimedia system is capable of communicating with the mobile phone allowing the user to make phone calls through the multimedia system.

10. The method of claim 9, wherein the information includes information regarding who the user is talking based on the contact list of the mobile phone to is uploaded to the user's social networking website.

11. The method of claim 1, wherein the information includes information to the user's current location retrieved by GPS is stored in the multimedia system.

12. The method of claim 11, wherein the GPS-enabled device includes a point of interest input capability and wherein the information includes information regarding where the user is traveling to based on the point of interest inputted by the user.

13. An apparatus and system capable of sharing a user's activities within a vehicle with a social networking website, the apparatus and system comprising:
   a personal electronic device capable of accessing a user's social networking website, a storage system capable of storing information in the personal electronic device; and
   a vehicle multimedia system housed in the vehicle, the multimedia system in communication with the personal electronic device, the multimedia system having a computer processing unit, a second storage system capable of storing information in the vehicle multimedia system, the vehicle multimedia system capable of communicating information from the multimedia system regarding the multimedia system to and from the personal electronic device and uploading information regarding current activity occurring one of: a GPS, an audio player or a mobile phone occurring within the vehicle from the personal electronic device to post the information regarding the current activity to the user's social networking website on a mobile wireless network.

14. The apparatus and system of claim 13, wherein the information includes audio information uploaded to the user's social networking website updates a user's status, wherein the audio information includes a song name, an artist's name or an album name.

15. The apparatus and system of claim 13, wherein the personal electronic device and the vehicle multimedia system communicate via Bluetooth.

16. The apparatus and system of claim 13, wherein the personal electronic device and the vehicle multimedia system communicate over a satellite based network.

17. The apparatus and system of claim 13, wherein the personal electronic device is a mobile phone in communication with the multimedia system having a contact list.

18. The apparatus and system of claim 17, wherein the information includes information regarding who the user is talking based on the contact list of the mobile phone to is uploaded to the user's social networking website.

19. The apparatus and system of claim 13, wherein the information includes information to the user's current location based on a set of GPS data stored in the multimedia system.

20. The apparatus and system of claim 19, wherein the information includes information regarding where the user is traveling to based on a point of interest inputted by the user.

* * * * *